(12) United States Patent
Kim

(10) Patent No.: US 9,746,880 B2
(45) Date of Patent: Aug. 29, 2017

(54) TOUCH PANEL AND TOUCH DEVICE INCLUDING THE SAME

(71) Applicant: LG INNOTEK CO., LTD., Seoul (KR)

(72) Inventor: Jin Bok Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 170 days.

(21) Appl. No.: 14/674,194

(22) Filed: Mar. 31, 2015

(65) Prior Publication Data

US 2015/0277643 A1    Oct. 1, 2015

(30) Foreign Application Priority Data

Apr. 1, 2014    (KR) .................. 10-2014-0038470

(51) Int. Cl.
*G06F 3/041*    (2006.01)
*G06F 1/16*    (2006.01)
*G06F 3/044*    (2006.01)

(52) U.S. Cl.
CPC .......... *G06F 1/1626* (2013.01); *G06F 1/1643* (2013.01); *G06F 1/1698* (2013.01); *G06F 3/044* (2013.01); *G06F 3/0416* (2013.01); *G06F 2203/04107* (2013.01)

(58) Field of Classification Search
CPC .... G06F 1/1626; G06F 1/1698; G06F 1/1643; G06F 3/044; G06F 3/0416; G06F 2203/04107
See application file for complete search history.

(56) References Cited

U.S. PATENT DOCUMENTS

| 2011/0148811 | A1* | 6/2011 | Kanehira | G06F 3/044 345/174 |
| 2012/0127094 | A1 | 5/2012 | Jeong | |
| 2013/0229364 | A1* | 9/2013 | Yu | G06F 3/044 345/173 |
| 2013/0257712 | A1* | 10/2013 | Imamura | H01Q 1/243 345/156 |
| 2013/0307818 | A1* | 11/2013 | Pope | G06F 3/044 345/174 |

FOREIGN PATENT DOCUMENTS

| KR | 10-2012-0053855 A | 5/2012 |
| KR | 10-2014-0019146 A | 2/2014 |

* cited by examiner

*Primary Examiner* — Ilana Spar
*Assistant Examiner* — Brent D Castiaux
(74) *Attorney, Agent, or Firm* — KED & Associates, LLP

(57) ABSTRACT

A touch panel of the embodiment includes a substrate including an active area and an unactive area; a sensing electrode on the substrate; a wire electrically connected with the sensing electrode; a ground electrode on the substrate; a sub-ground electrode protruding toward an end of the substrate; and a first area defined by the sub-ground electrode, wherein the first area has a width larger than a line width of the sub-ground electrode. A touch device of the embodiment includes a display panel; and a touch panel on the display panel, wherein the touch panel includes a substrate; a sensing electrode on the substrate; a wire electrically connected with the sensing electrode; a ground electrode on the substrate; a sub-ground electrode protruding toward an end of the substrate; and a first area defined by the sub-ground electrode.

17 Claims, 15 Drawing Sheets

TOUCH PANEL AND TOUCH DEVICE INCLUDING THE SAME

CROSS-REFERENCE TO RELATED APPLICATION

This application claims priority under 35 U.S.C. §119 to Korean Application No. 10-2014-0038470 filed on Apr. 1, 2014, whose entire disclosure is hereby incorporated by reference.

BACKGROUND

1. Field

The embodiment relates to a touch panel and a touch device including the same.

2. Background

A touch panel is installed on a display surface of an image display device such as a cathode ray tube (CRT), a liquid crystal display (LCD), a field emission display (FED), a plasma display panel (PDP), and an electro-luminescence device (ELD), so that a user inputs predetermined information into an electronic appliance by pressing the touch panel while viewing the image display device.

In such a touch panel, electric signal interference may occur due to static electricity or ESD, so that the accuracy of touch is deteriorated.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Figure 1:
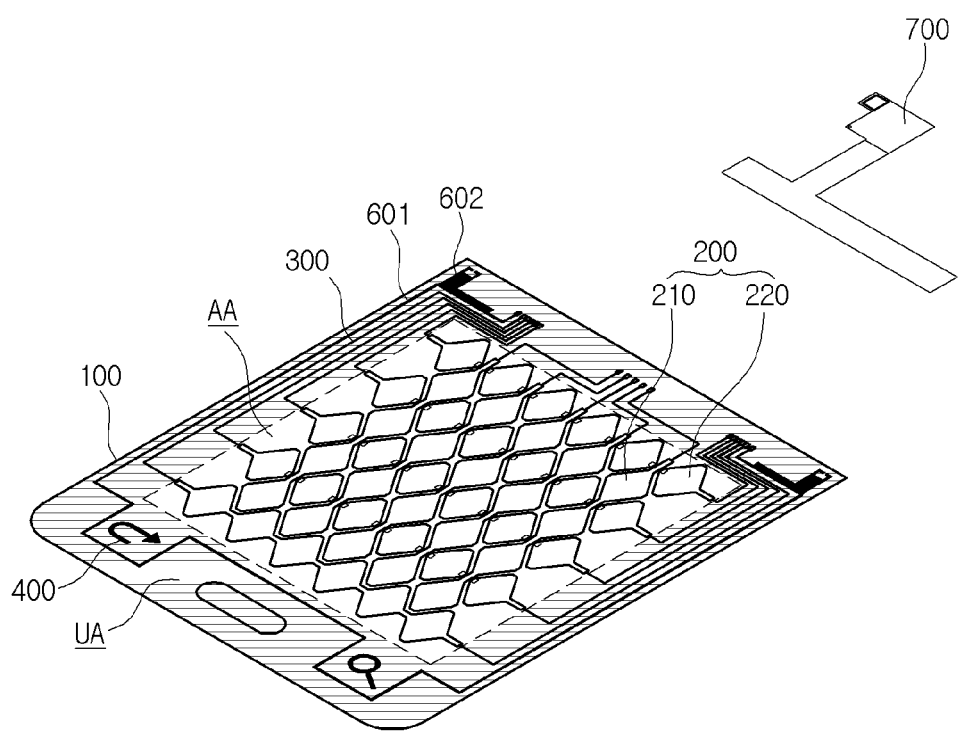
FIG. 1 is a perspective view of a touch panel according to the embodiment.

In the following description of the embodiments, it will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer will be described with reference to the drawings.

In addition, when a predetermined part "is connected to" another part, this means not only that the predetermined part is directly connected to another part, but also that the predetermined is indirectly connected to another part while interposing another component between the predetermined part and another part. In addition, when a predetermined part "includes" a predetermined component, the predetermined part does not exclude other components, but may further include other components unless indicated otherwise.

The thickness and size of each layer (film), region, pattern or structure shown in the drawings may be modified, so the size of elements shown in the drawings does not utterly reflect an actual size.

Hereinafter, embodiments will be described in detail with reference to accompanying drawings.

Figure 2:
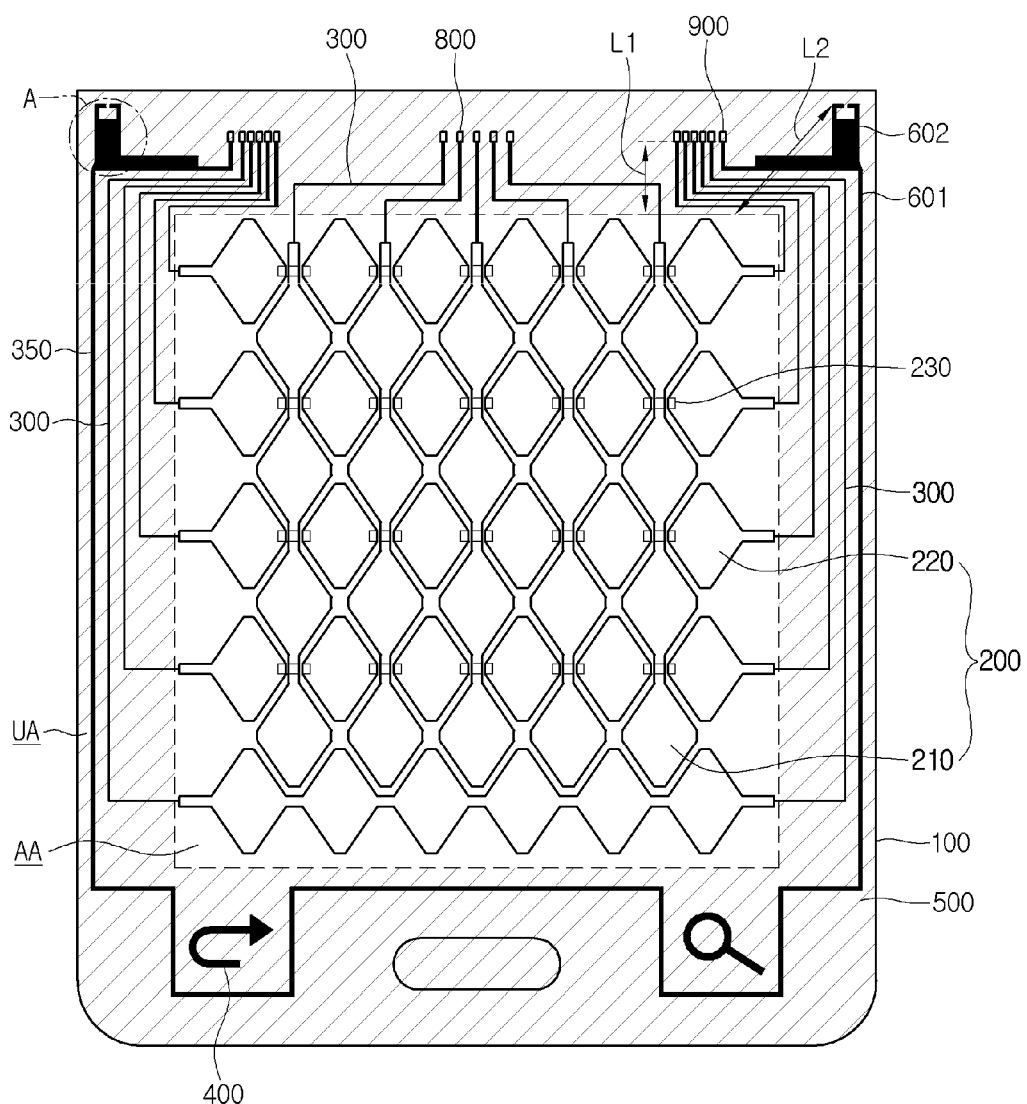
FIG. 2 is a plan view of a touch panel according to the embodiment.

Referring to FIGS. 1 and 2, a touch panel according to the embodiment may include a substrate 100, a sensing electrode 200, a wire 300, a ground electrode 601 and a printed circuit board 700.

The substrate 100 may be rigid or flexible. For example, the substrate 100 may include glass or plastic. In detail, the substrate 100 may include chemically tempered/semi-tempered glass, such as soda lime glass or aluminosilicate glass, reinforced plastic or flexible plastic, such as polyimide (PI), polyethylene terephthalate (PET), propylene glycol (PPG) or polycarbonate (PC), or sapphire.

In addition, the substrate 100 may include an optical isotropic film. For example, the substrate 100 may include cyclic olefin copolymer (COO), cyclic olefin polymer (COP), an optical isotropic polycarbonate (PC), or optical isotropic polymethylmethacrylate (PMMA).

The sapphire has superior electric characteristics, such as permittivity, so that a touch response speed may be remarkably increased and a space touch, such as hovering, may be easily implemented. The sapphire has high surface hardness, so the sapphire may be used for a cover substrate. The hovering signifies a technique of recognizing coordinates even at a short distance from a display.

In addition, the substrate 100 may be bendable to have a partial curved surface. In other words, the substrate 100 is bendable such that a portion of the substrate has a flat surface and another portion of the substrate has a curved surface. In detail, an end portion of the substrate 100 may be bent with a curved surface or may be curved or bent with a surface having a random curvature.

In addition, the substrate 100 may be a flexible substrate having a flexible characteristic.

Further, the substrate 100 may include a curved or bended substrate. In this case, the touch panel including the substrate may have flexible, curved or bended characteristics. Accordingly, the touch panel according to the embodiment can be easily carried and variously designed.

The sensing electrode, the wire electrode and the printed circuit board may be disposed on the substrate. That is, the substrate may serve as a support substrate.

The substrate may include a cover substrate. That is, the sensing electrode, the wire electrode and the printed circuit board may be supported by the cover substrate. Otherwise, an additional cover substrate may be disposed on the substrate. That is, the sensing electrode, the wire electrode and the printed circuit board may be supported by the substrate and the substrate may be combined (bonded) with the covert substrate by an adhesive layer.

An active area AA and an unactive area UA may be defined on the substrate.

An image may be displayed on the active area AA and may not be displayed on the unactive area UA disposed around the active area AA.

In addition, a position of an input device (for example, a finger) may be detected in at least one of the active area AA and the unactive area UA. If the input device, such as the finger, touches the touch panel, capacitance variation may occur in an area touched by the input device, so the area is detected as the touch position.

A printing layer 500, the sensing electrode 200 and the wire 300 may be disposed on one surface of the substrate 100.

The printing layer 500 and the wire 300 may be disposed on the unactive area UA and the sensing electrode 200 may be disposed on the active area AA.

The printing layer 500 may be coated with a material having a predetermined color so that the wire disposed on the unactive area UA and the printed circuit board connecting the wire to an external circuit cannot be viewed from the outside.

The printing layer 500 may have a color suitable for a desired outer appearance thereof. For example, the printing layer 500 may include black or white pigments to represent black or white. In addition, the printing layer 500 may represent various colors, such as red and blue, by using various color films.

Further, a desired logo may be formed in the printing layer 500 through various schemes. The printing layer 500 may be formed through deposition, print, and wet coating schemes.

The printing layer may include at least one layer. For example, the printing layer may be prepared as a single layer or may be prepared as at least two layers having mutually difference widths.

In addition, the printing layer may be formed of a film. If the substrate is flexible or has a curvature, the printing layer may not be readily formed on the substrate. Thus, the printing layer is formed on the film and then the film formed with the printing layer is applied to the curved or flexible substrate.

The printing layer may be formed on one surface of the substrate where the cover substrate is formed or on the other surface of the substrate.

The sensing electrodes 200 may be disposed on the substrate 100. In detail, the sensing electrodes 200 may be disposed on the active area AA of the substrate 100. The sensing electrodes 200 may include a driving electrode to transmit a signal and a receiving electrode to receive a signal. For the purpose of convenience, the driving electrode and the receiving electrode together will be called the sensing electrode for sensing a touch position.

The sensing electrode 200 may include a conductive material. In detail, the sensing electrode 200 may include a transparent conductive material. For example, the sensing electrode 200 may include metal oxide such as indium tin oxide (ITO), indium zinc oxide (IZO), copper oxide, tin oxide, zinc oxide, or titanium oxide. In addition, the sensing electrode 200 may include a nanowire, a photosensitive nanowire film, carbon nanotube (CNT), graphene, conductive polymer or various metals. For instance, the sensing electrode 200 may include Cr, Ni, Cu, Al, Ag, Mo, and an alloy thereof. If the sensing electrode 200 includes the metal, the sensing electrode 200 may be aligned in the form of a mesh so that the sensing electrode 200 may not be viewed in the active area AA.

The sensing electrode 200 may have a mesh shape. In detail, the sensing electrode 200 may include a plurality of sub-electrodes which cross each other in the form of a mesh.

In detail, the sensing electrode 200 may include mesh lines LA and mesh openings OA between the mesh lines LA due to the sub-electrodes which cross each other in the mesh shape.

The mesh line LA may have a line width in the range of about 0.1 μm to about 10 μm. If the mesh line LA has a line width less than 0.1 μm, it may be impossible to form the mesh line LA through the manufacturing process or the short of the mesh line LA may occur. If the mesh line LA has a line width above 10 μm, the electrode pattern may be viewed from the outside so the visibility may be deteriorated. Preferably, the line width of the mesh line LA may be in the range of about 0.5 μm to about 7 μm. More preferably, the line width of the mesh line LA may be in the range of about 1 μm to about 3.5 μm.

The mesh opening OA may have various shapes. For instance, the mesh opening OA may have various shapes such as a polygonal shape including a rectangular shape, a diamond shape, a pentagonal shape or a hexagonal shape, or a circular shape. In addition, the mesh opening OA may have a regular shape or a random shape.

Since the sensing electrode has the mesh shape, it is possible to hide the pattern of the sensing electrode on the active area, that is, the display area. That is, even if the sensing electrode is formed of metal, the pattern may not be viewed. In addition, even if the sensing electrode is applied to a large-size touch panel, the resistance of the touch panel may be lowered.

The sensing electrode 200 may include a first sensing electrode 210, a second sensing electrode 220 and a bridge electrode 230. The first sensing electrode 210, the second sensing electrode 220 and the bridge electrode 230 may include the same material or mutually different materials. In addition, the first sensing electrode 210, the second sensing electrode 220 and the bridge electrode 230 may be disposed on the same surface of the substrate 100.

For example, the bridge electrode 230 may be aligned in the form of a bar. In other words, the bridge electrode 230 may be aligned in the form of bars spaced apart from each other on the active area AA. The bridge electrode 230 may connect the second sensing electrodes 220 which will be described later.

An insulating layer may be disposed on the bridge electrode 230. In detail, the insulating layer may be partially disposed on the bridge electrode 230 and the bridge electrode 230 may be partially covered with the insulating layer. For example, when the bridge electrode 230 is aligned in the form of a bar, the insulating layer may be disposed on the bridge electrode 230 except for one end and the other end of the bridge electrode 230, that is, both ends of the bridge electrode 230.

The first sensing electrode 210 and the second sensing electrode 220 may be disposed on the active area AA to serve as sensors for sensing the touch. In detail, the first sensing electrode 210 may extend in one direction on the active area AA and the second sensing electrode 220 may extend in a direction different from an extension direction of the first sensing electrode 210.

One of the first sensing electrode 210 and the second sensing electrode 220 may be disposed on the insulating layer and the other may be connected to both ends of the bridge electrode 230. Thus, the first sensing electrode 210 and the second sensing electrode 220 may be electrically connected to each other without being shorted due to the bridge electrode and the insulating material.

Although it has been described that the bridge electrode, the insulating layer and the sensing electrodes are sequentially laminated, the embodiment is not limited thereto. It is also possible to sequentially laminate the sensing electrodes, the insulating layer and the bridge electrode.

If the input device, such as the finger, touches the touch panel, capacitance variation may occur in an area touched by the input device, so the area is detected as the touch position.

The wire 300 for electrically connecting the sensing electrodes may be disposed on the unactive area UA. One end of the wire 300 may be connected to the sensing electrode 200 and the other end of the wire 300 may be connected to the printed circuit board 700. In detail, the wire 300 may be connected to the sensing electrode 200 and withdrawn to the upper end or lower end of the substrate 100. In addition, a first pad part 800 may be disposed at the other end of the wire 300 to connect the wire 300 to the printed circuit board 700.

In other words, the wire 300 may transfer the touch signal sensed by the first sensing electrode 210 and the second sensing electrode 220 to the printed circuit board 700 on which a drive chip 710 is mounted, so that the touch operation may be performed. For example, the printed circuit board 700 may be a flexible printed circuit board (FPCB).

The ground electrode 601 may be disposed adjacent to the wire 300. The ground electrode 601 may have a width larger than a width of the wire 300. The ground electrode 601 may prevent static electricity or ESD in the touch panel. That is, the static electricity or ESD may move along a path of the ground electrode 601, so that the static electricity or ESD can be prevented from being introduced into the touch panel. Since the ground electrode 601 is disposed along an edge of the substrate 100, the static electricity or ESD can be effectively prevented from being introduced into the touch panel. The ground electrode 601 may be disposed along an entire edge of the substrate 100. The ground electrode 610 may be connected to the printed circuit board 700 in order to discharge the ESD in the touch panel as an electric signal. Thus, the signal interference may be prevented so that the accuracy of the touch and reliability may be improved.

The ground electrode 601 may include a material the same as or similar to a material of the wire 300.

One end of the ground electrode 601 may be connected to the printed circuit board 700. In detail, the ground electrode 601 may be withdrawn to the upper end or lower end of the substrate 100. In addition, a second pad part 900 may be disposed at one end of the ground electrode 601 to connect the ground electrode 601 to the printed circuit board 700.

Meanwhile, an instruction icon 400 may be disposed at a lower end of the unactive area UA. An LED may be provided behind the instruction icon 400 to illuminate the instruction icon 400 such that a user can readily recognize the instruction icon 400. In this case, the ground electrode 601 may be disposed while detouring the instruction icon 400. That is, the ground electrode 601 may surround the instruction icon 400. The ground electrode 601 may be aligned along the instruction icon 400. Thus, noise can be prevented and the accuracy can be improved when the user inputs the instruction through the instruction icon 400.

Meanwhile, a sub-ground electrode 602 may provide an end of the substrate 100. The sub-ground electrode 602 may branch from the ground electrode 601.

Figure 3:
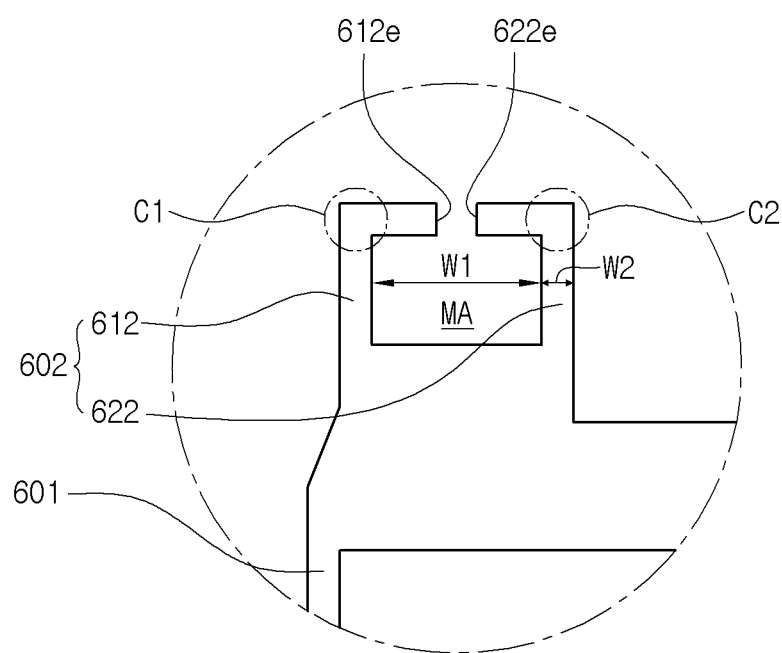
FIG. 3 is an enlarged view of an A portion of FIG. 2.

In this case, referring to FIG. 3, a first area MA may be defined in the sub-ground electrode 602. The first area MA may be an open area. That is, the first area MA may be a space formed in the sub-ground electrode 602. The sub-ground electrode 602 may surround the first area MA. The term "surround" may signify that the first area MA is completely closed by the sub-ground electrode 602 or the first area MA is partially closed by the sub-ground electrode 602 due to the spacing of the sub-ground electrode 602 as shown in the drawing. The display panel may be disposed under the touch panel and various mechanical components may be disposed on the display panel. For example, an antenna may be disposed on the display panel. The touch panel may be combined with the display panel to constitute the touch device. In this case, the mechanical components may be disposed on an area corresponding to the first area MA. That is, the mechanical components may be disposed on the first area MA.

The first area MA may have a width larger than a line width of the sub-ground electrode 602. In detail, a minimum width W1 of the first area MA may be larger than a minimum line width W2 of the sub-ground electrode 602. Thus, the mechanical components may not overlap with the ground electrode 601. Therefore, noise caused by the mechanical component may be reduced or prevented. In addition, signal distortion caused by the mechanical component may be reduced.

Meanwhile, the sub-ground electrode 602 may be disposed at an outer portion of the substrate 100. That is, the sub-ground electrode 602 may be disposed at an edge of the substrate 100. The sub-ground electrode 602 may be disposed at an outermost portion of the substrate 100. The sub-ground electrode 602 may protrude from the ground electrode 601.

Thus, static electricity or ESD, which is introduced from the outside of the touch panel, may be primarily induced to the sub-ground electrode 602, so that the static electricity or ESD can be effectively blocked. In addition, wires 300 can be prevented from being damaged.

On the substrate 100, the sub-ground electrode 602 may be disposed away from the first and second pad parts 800 and 900. That is, the sub-ground electrode 602 may be closer to the end of the substrate 100 when compared to the first and second pad parts 800 and 900. In detail, a shortest distance L2 from the active area AA to the end of the sub-ground electrode 602 may be longer than a shortest distance L1 from the active area AA to the first or second pad part 800 or 900. In other words, the shortest distance from the edge of the substrate 100 to the sub-ground electrode 602 may be shorter than the distance from the edge of the substrate 100 to the first and second pad parts 800 and 900. Thus, the sub-ground electrode 602 may have a length sufficient to cover the first and second pad parts 800 and 900. Accordingly, the ESD or noise, which may occur in the first and second pad parts 800 and 900 due to the sub-ground electrode 602, may be effectively prevented.

In this case, the sub-ground electrode 602 and the ground electrode 601 may have mutually different patterns.

In detail, the sub-ground electrode 602 may include a first sub-ground electrode 612 and a second sub-ground electrode 622. The first sub-ground electrode 612 may face the second sub-ground electrode 622. That is, an end 612e of the first sub-ground electrode 612 may face an end 622a of the second sub-ground electrode 622.

The first area MA may be disposed between the first sub-ground electrode 612 and the second sub-ground electrode 622. That is, the first area MA may be defined by the first sub-ground electrode 612 and the second sub-ground electrode 622.

The first sub-ground electrode 612 and the second sub-ground electrode 622 may include at least one bending portion.

For example, as shown in FIG. 3, the first sub-ground electrode 612 and the second sub-ground electrode 622 may include bending portions C1 and C2, respectively. That is, the first sub-ground electrode 612 extending in one direction may be bent in the other direction. In the same manner, the second sub-ground electrode 622 extending in one direction may be bent in the other direction. Thus, the end 612e of the first sub-ground electrode 612 may face the end 622a of the second sub-ground electrode 622.

Figure 4:
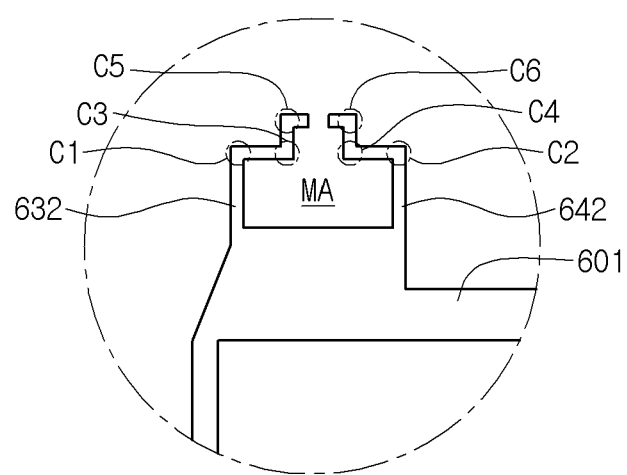
FIG. 4 is an enlarged view of a touch panel according to another embodiment.

Meanwhile, referring to FIG. 4, a first sub-ground electrode 632 according to another embodiment may include three bending portions C1, C3 and C5. In the same manner, a second sub-ground electrode 642 according to another embodiment may include three bending portions C2, C4 and C6. The sub-ground electrodes 632 and 642 may protrude from the ground electrode 601 to the outer portion of the substrate 100 through the bending portions. Thus, static electricity or ESD, which is introduced from the outside of the touch panel, may be primarily induced to the sub-ground electrode 602, so that the static electricity or ESD can be effectively blocked.

Figure 5:
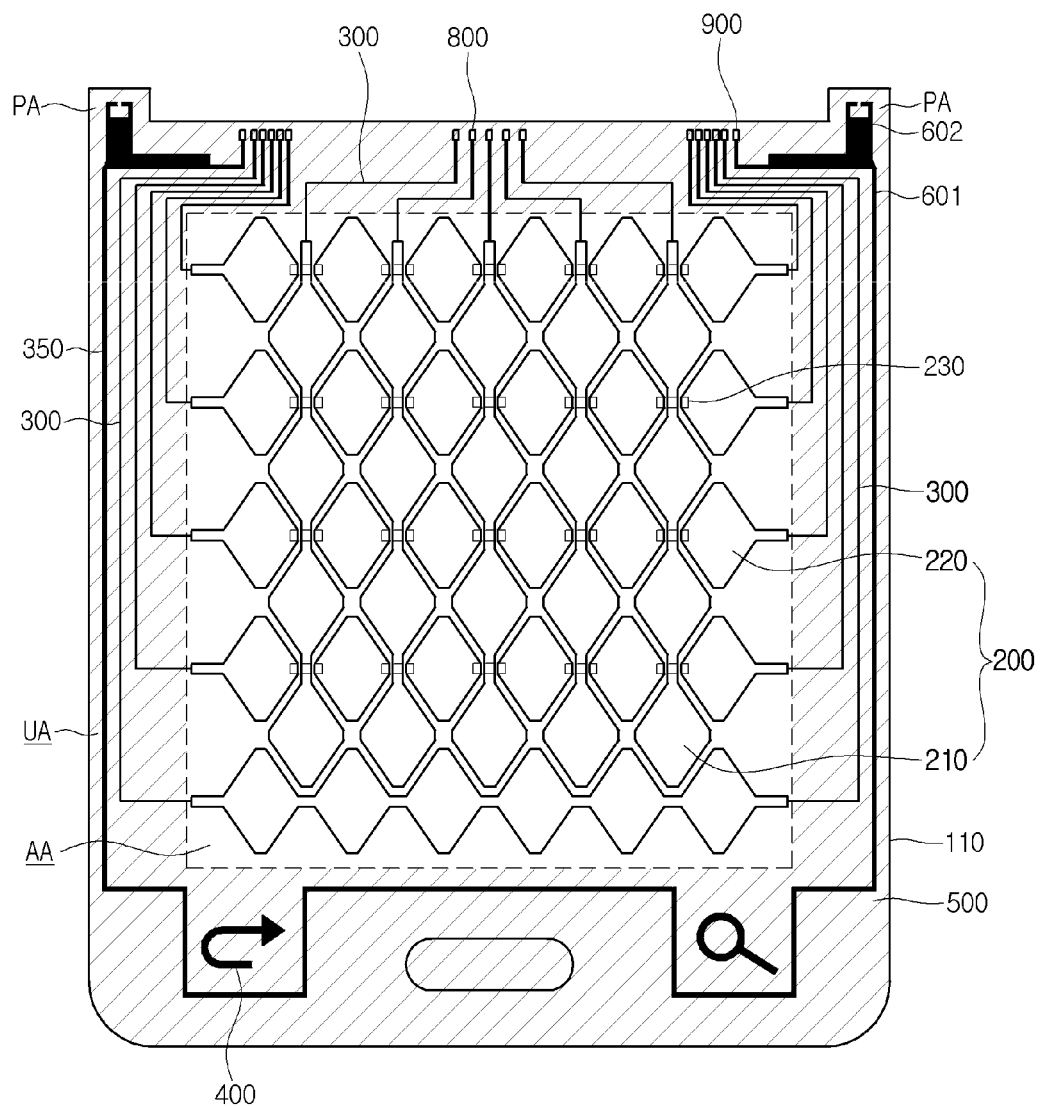
FIGS. 5 and 6 are plan views of a touch panel according to another embodiment.

In addition, referring to FIG. 5, a substrate 110 may include a protrusion area PA. The protrusion area PA may be disposed at an outer portion of the substrate 110. In detail, the protrusion area PA may be disposed at an edge of the substrate 110.

The protrusion area PA may correspond to the sub-ground electrode 602. That is, the protrusion area PA may be disposed at an area where the sub-ground electrode 602 is disposed. Thus, the sub-ground electrode 602 may be disposed on the protrusion area PA.

Since the substrate 110 includes the protrusion area PA, the accuracy of the align process can be ensured when forming the sub-ground electrode 602. That is, the protrusion area PA may serve as an align mark, so the sub-ground electrode 602 may be precisely formed on the desired position.

Figure 6:
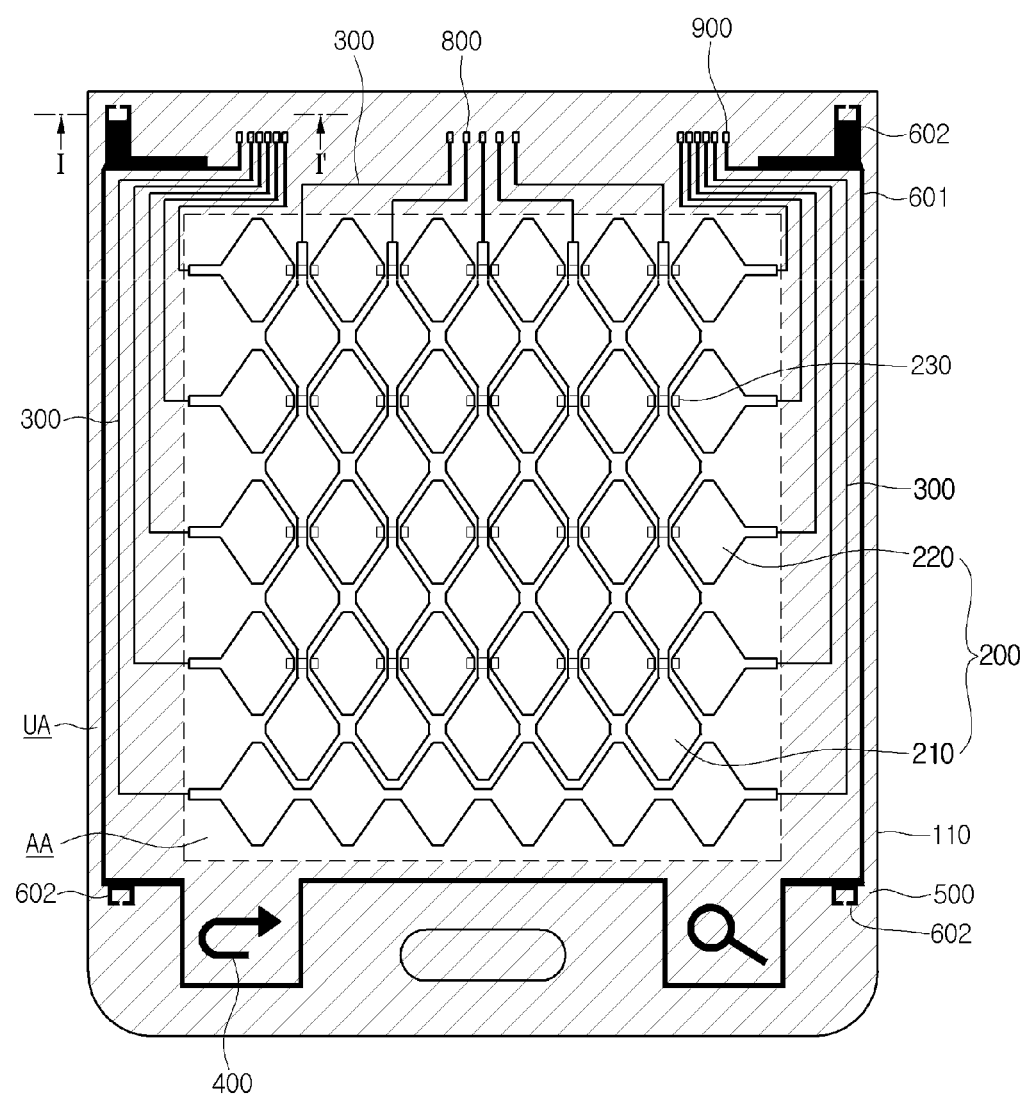

Referring to FIG. 6, the sub-ground electrodes 602 may be disposed at left upper and lower portions and right upper and lower portions of the outer portion of the substrate 100. That is, the sub-ground electrodes 602 may be disposed at the whole outer portion of the substrate 100. In detail, the sub-ground electrodes 602 may be disposed at the left and right portions of an upper portion of the substrate 100 and the left and right portions of a lower portion of the substrate 100. Thus, static electricity or ESD, which is introduced from various directions, may be primarily induced to the sub-ground electrodes 602, so that the static electricity or ESD can be effectively blocked. Especially, the sub-ground electrodes 602 may be provided at the left and right portions of the lower portion of the substrate 100, so that the static electricity or ESD generated from the instruction icon 400 may be induced to the sub-ground electrodes 602, thereby ensuring the accuracy of the instruction input.

Figure 7:
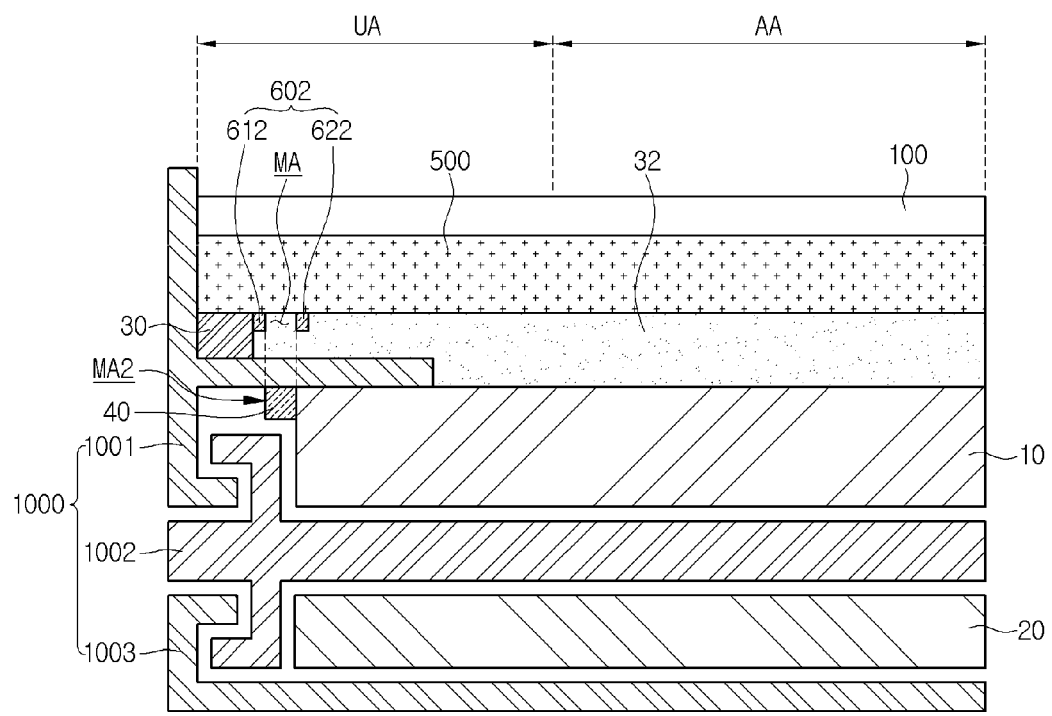
FIG. 7 is a sectional view taken along line I-I' of FIG. 6.

Meanwhile, referring to FIG. 7, the touch panel may be accommodated in a set cover 1000. In detail, a display panel 10 may be disposed under the touch panel and a first set cover 1001 may be disposed between the display panel 10 and the touch panel. The first set cover 1001 may support the touch panel.

A set cover attachment film 30 and an adhesive layer 32 may be disposed between the touch panel and the display panel 10. Thus, the touch panel may be stably combined with the display panel 10.

Meanwhile, a second set cover 1002 combined with the first set cover 1001 may be additionally provided. The second set cover 1002 may support the display panel 10.

A second area MA2 corresponding to the first area MA may be defined at a lateral side of the display panel 10. That is, the second area MA2 may vertically correspond to the first area MA. The second area MA2 may have an area the same as or similar to an area of the first area MA.

A mechanical component 40 may be disposed in the second area MA2. The component 40 may include an antenna. Thus, the mechanical component 40 may not overlap with the sub-ground electrodes 602 and signal distortion caused by the mechanical component 40 may be reduced.

Meanwhile, a main board 20 may be disposed under the display panel 10. The main board 20 may drive the display panel 10. In detail, the main board 20 may set the execution environment of the display device and may perform the data input/output exchange. The main board 20 may be equipped with mechanical components, such as a control unit CPU, a microprocessor, a coprocessor, a memory, a bios and a connection circuit.

Meanwhile, a third set cover 1003 combined with the second set cover 1002 may be additionally provided. The third set cover 1003 may support the main board 20.

The set cover 1000 may have a rectangular frame shape. In addition, the set cover 1000 may include plastic or metal.

Figure 8:
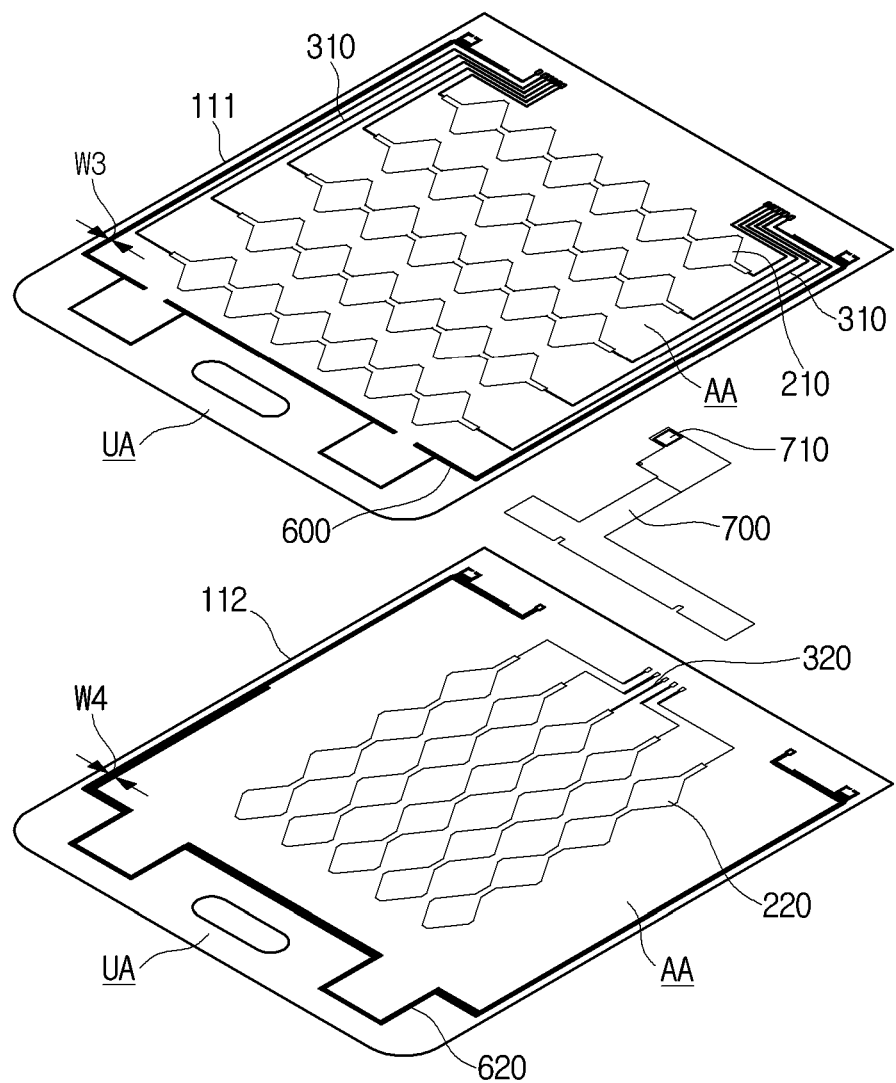
FIG. 8 is a perspective view of a touch panel according to another embodiment.

Meanwhile, referring to FIG. 8, the first sensing electrode 210 may be formed on one surface of a cover substrate 111 and the second sensing electrode 220 may be disposed on one surface of a substrate 112 formed on the cover substrate 111. The ground electrode may include an upper ground electrode 600 disposed on the cover substrate 111 and a lower ground electrode 620 disposed on the substrate 112.

In this case, a line width W3 of the upper ground electrode 600 may be different from a line width W4 of the lower ground electrode 620. In detail, the line width W3 of the upper ground electrode 600 may be smaller than the line width W4 of the lower ground electrode 620. Such a line width relates to the withdrawing method and design of the first wire 310 and the second wire 320. In detail, the first wire 310 disposed on the cover substrate 111 may be withdrawn along both sides of the cover substrate 111 so that the line width of the lower ground electrode 620 may be relatively reduced. In addition, the second wire 320 disposed on the substrate 112 may be withdrawn only along the upper portion of the substrate 112, so a space may be ensured at both sides of the substrate 112. A ratio of the line width W3 of the upper ground electrode 600 to the line width W4 of the lower ground electrode 620 may be 1:1 to 1:2. If the ratio of the line width W3 of the upper ground electrode 600 to the line width W4 of the lower ground electrode 620 exceeds 1:1, the lower ground electrode 620 may have the wider line width W4. Thus, the static electricity or ESD can be effectively prevented due to the lower ground electrode 620 having the wider line width W4.

Figure 9:
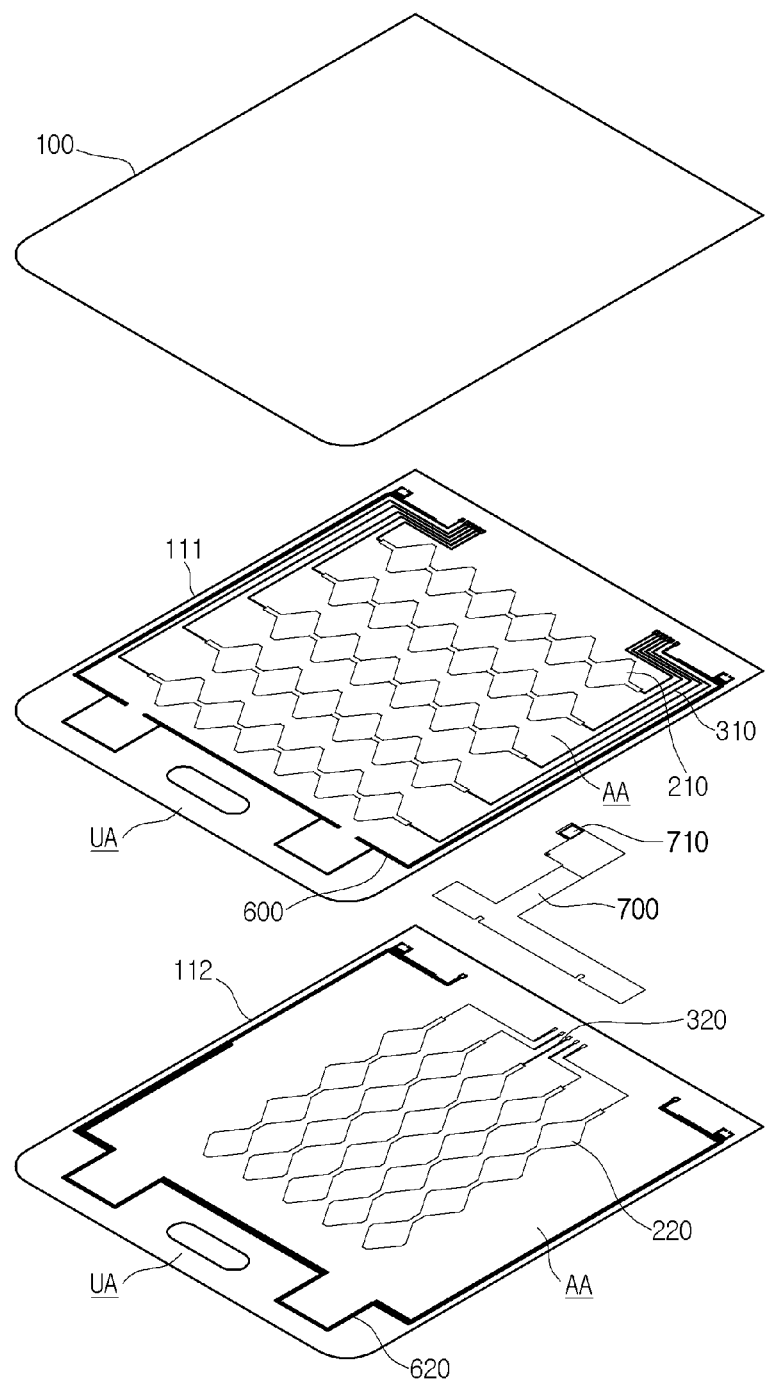
FIG. 9 is a perspective view of a touch panel according to another embodiment.

In addition, if the ratio of the line width W3 of the upper ground electrode 600 to the line width W4 of the lower ground electrode 620 is less than 1:2, it is not necessary to enlarge a bezel area for covering the upper ground electrode 600 or the lower ground electrode 620. Meanwhile, referring to FIG. 9, the first sensing electrode 210 may be formed on one surface of a first substrate 111 disposed on a cover substrate 100 and the second sensing electrode 220 may be disposed on one surface of a second substrate 112 formed on the first substrate 111. In this case, the ground electrode may include an upper ground electrode 600 disposed on the first substrate 111 and a lower ground electrode 620 disposed on the second substrate 112.

Hereinafter, the touch device including the touch panel coupled with the display panel described above will be explained with reference to FIGS. 10 to 13.

Figure 10:
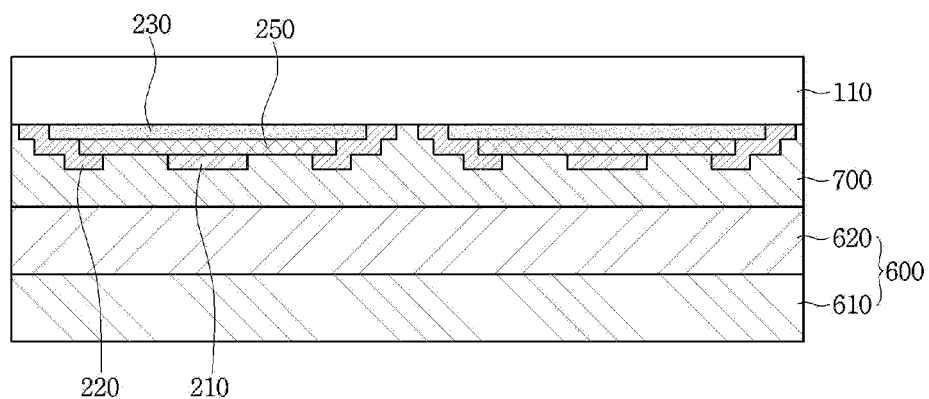
FIGS. 10 to 13 are sectional views showing a touch panel according to another embodiment.
Figure 11:
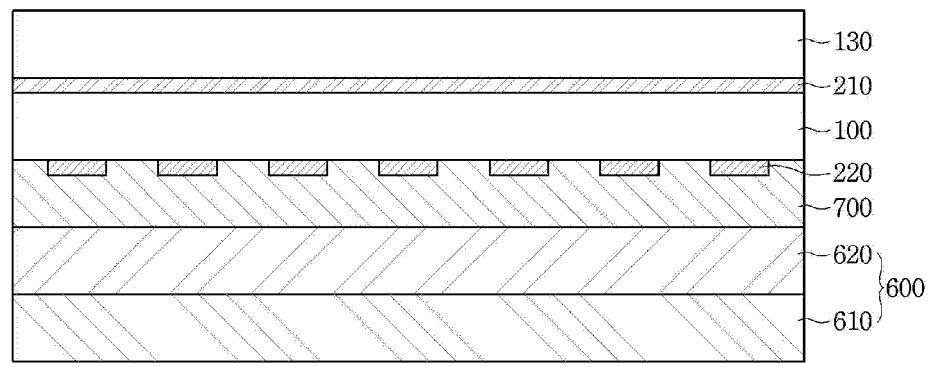

Referring to FIGS. 10 and 11, the touch device according to the embodiment may include the touch panel disposed on the display panel 600.

In detail, referring to FIG. 10, the touch device may be formed by combining the cover substrate 100 with the display panel 600. The cover substrate 100 may be combined with the display panel 600 by an adhesive layer 700. For example, the cover substrate 100 may be combined with the display panel 600 by the adhesive layer 700 including optically clear adhesive (OCA).

Referring to FIG. 11, when a substrate 102 is further disposed on a cover substrate 101, the touch device may be formed by combining the substrate 102 with the display panel 600. The substrate 102 may be combined with the display panel 600 by the adhesive layer 700. For instance, the substrate 102 may be combined with the display panel 600 by the adhesive layer 700 including optically clear adhesive (OCA).

The display panel 600 may include a first panel substrate 610 and a second panel substrate 620.

When the display panel 600 is a liquid crystal display panel, the display panel 600 may be formed in a structure in which the first panel substrate 610 including a thin film transistor (TFT) and a pixel electrode is combined with the second panel substrate 620 including color filter layers while a liquid crystal layer is interposed between the first and second substrates 610 and 620.

In addition, the display panel 600 may be a liquid crystal display panel having a COT (color filter on transistor) structure in which a thin film transistor, a color filter, and a black matrix are formed on the first panel substrate 610, and the first panel substrate 610 is combined with the second panel substrate 620 while a liquid crystal layer is interposed between the first and second panel substrates 610 and 620. In other words, the thin film transistor may be formed on the first panel substrate 610, a protective layer may be formed on the thin film transistor, and the color filter layer may be formed on the protective layer. In addition, a pixel electrode making contact with the thin film transistor is formed on the first panel substrate 610. In this case, in order to improve the aperture rate and simplify the mask process, the black matrix may be omitted, and the common electrode may serve as the black matrix.

In addition, when the display panel 600 is a liquid crystal display panel, the display device may further include a backlight unit for providing light from the rear surface of the display panel 600.

When the display panel 600 is an organic electroluminescent display panel, the display panel 600 may include a self-light emitting device which does not require any additional light source. The display panel 600 includes a thin film transistor formed on the first panel substrate 610 and an organic light emitting device (OLED) making contact with the thin film transistor. The OLED may include an anode, a cathode and an organic light emitting layer formed between the anode and the cathode. In addition, the second panel substrate 620 may be further formed on the organic light emitting device to perform the function of an encapsulation substrate 100 for encapsulation.

Figure 12:
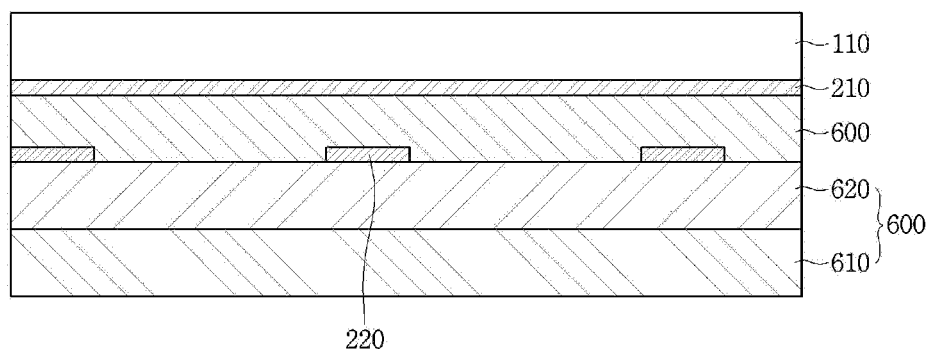

Referring to FIG. 12, the touch device according to the embodiment may include a touch panel integrally formed with the display panel 600. In other words, the substrate 100 to support at least one sensing electrode 200 may be omitted.

In detail, at least one sensing electrode 200 may be provided on at least one surface of the display panel 600.

That is, at least one sensing electrode 200 may be disposed on at least one surface of the first panel substrate 610 or the second panel' substrate 620.

In this case, at least one sensing electrode 200 may be disposed on a top surface of the substrate 100 located at a higher position.

Referring to FIG. 12, the first sensing electrode 210 may be disposed on one surface of the cover substrate. In addition, a first wire connected with the first sensing electrode 210 may be provided. Further, the second sensing electrode 220 may be disposed on one surface of the display panel 600. Further, a second wire connected with the second sensing electrode 220 may be provided.

The adhesive layer 700 may be disposed between the cover substrate and the display panel 600 so that the cover substrate may be combined with the display panel 600.

In addition, a polarizing plate may be provided under the cover substrate. The polarizing plate may be a linear polarizing plate or an anti-reflection polarizing plate. For example, when the display panel 600 is a liquid crystal display panel, the polarizing plate may be a linear polarizing plate. In addition, when the display panel 600 is an organic electroluminescent display panel, the polarizing plate may be an anti-reflection polarizing plate.

The touch device according to the embodiment may omit at least one substrate 100 that supports the sensing electrode 200. Thus, the touch device having thin thickness and light weight can be obtained.

Hereinafter, the touch device according to another embodiment will be described with reference to FIG. 13. The description about the elements and structures that have been described in the previous embodiments will be omitted in order to avoid redundancy. The same reference numerals will be assigned to the same elements.

Figure 13:
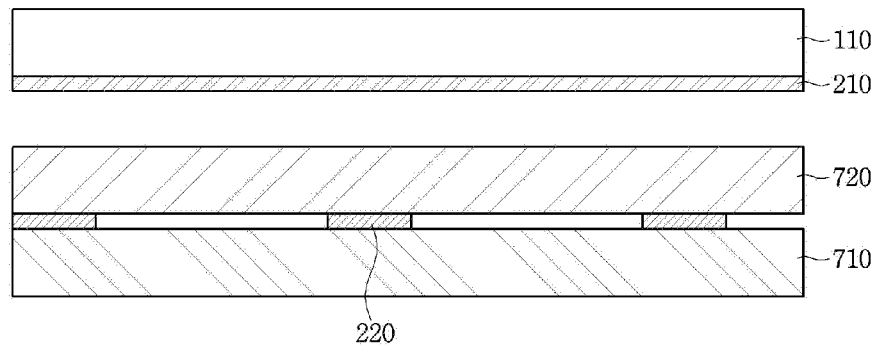

Referring to FIG. 13, the touch device according to another embodiment may include a touch panel formed integrally with the display panel 600. That is, the substrate 100 that supports at least one sensing electrode 200 may be omitted.

For example, the sensing electrode 200 provided in the active area to serve as a sensor which senses a touch and a wire to apply an electrical signal to the sensing electrode 200 may be formed inside the display panel. In detail, at least one sensing electrode 200 or at least one wire may be formed inside the display panel.

The display panel may include the first panel substrate 610 and the second panel substrate 620. In this case, at least one of the first and second sensing electrodes 210 and 220 may be interposed between the first panel substrate 610 and the second panel substrate 620. In other words, at least one sensing electrode 200 may be provided on at least one surface of the first panel substrate 610 or the second panel substrate 620.

In addition, the first sensing electrode 210 may be disposed on one surface of the cover substrate. Further, the first wire connected with the first sensing electrode 210 may be provided. In addition, the second sensing electrode 220 and the second wire may be disposed between the first panel substrate 610 and the second panel substrate 620. That is, the second sensing electrode 220 and the second wire may be provided inside the display panel and the first sensing electrode 210 and the first wire may be provided outside the display panel.

The second sensing electrode 310 and the second wire may be provided on the top surface of the first panel substrate 610 or the rear surface of the second panel substrate 620.

In addition, a polarizing plate may be further provided under the cover substrate.

When the display panel is a liquid crystal display panel, and when the second sensing electrode 220 is formed on the top surface of the first panel substrate 610, the sensing electrode 200 may be formed together with a thin film transistor (TFT) or a pixel electrode. In addition, when the second sensing electrode 220 is formed on the rear surface of the second panel substrate 620, a color filter layer may be formed on the sensing electrode 200 or the sensing electrode 200 may be formed on the color filter layer. When the display panel is an organic electroluminescent display panel, and when the second sensing electrode 220 is formed on the top surface of the first panel substrate 610, the second sensing electrode 220 may be formed together with a thin film transistor or an organic light emitting device.

The touch device according to the embodiment may omit at least one substrate 100 that supports the sensing electrode 200. Thus, the touch device having thin thickness and light weight can be obtained. In addition, the sensing electrode 200 and the wire may be formed together with devices formed on the display panel, so that the process can be simplified and the cost can be saved.

FIGS. 14 to 17 are views showing various examples of touch devices including a touch panel according to the embodiment.

Hereinafter, one example of the touch device employing the touch panel according to the embodiment will be described with reference to FIGS. 14 to 17.

Figure 14:
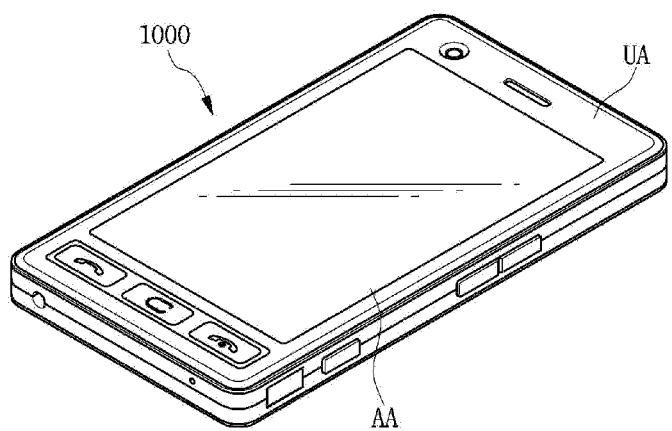
FIGS. 14 to 17 are views showing various examples of touch devices including a touch panel according to the embodiment.

Referring to FIG. 14, a mobile terminal is illustrated as an example of the touch device. The mobile terminal may include the active area AA and the unactive area UA. The active area AA is an area in which a touch signal is sensed due to the touch by a finger, and an instruction icon pattern part and a logo may be formed in the unactive area UA.

Figure 15:
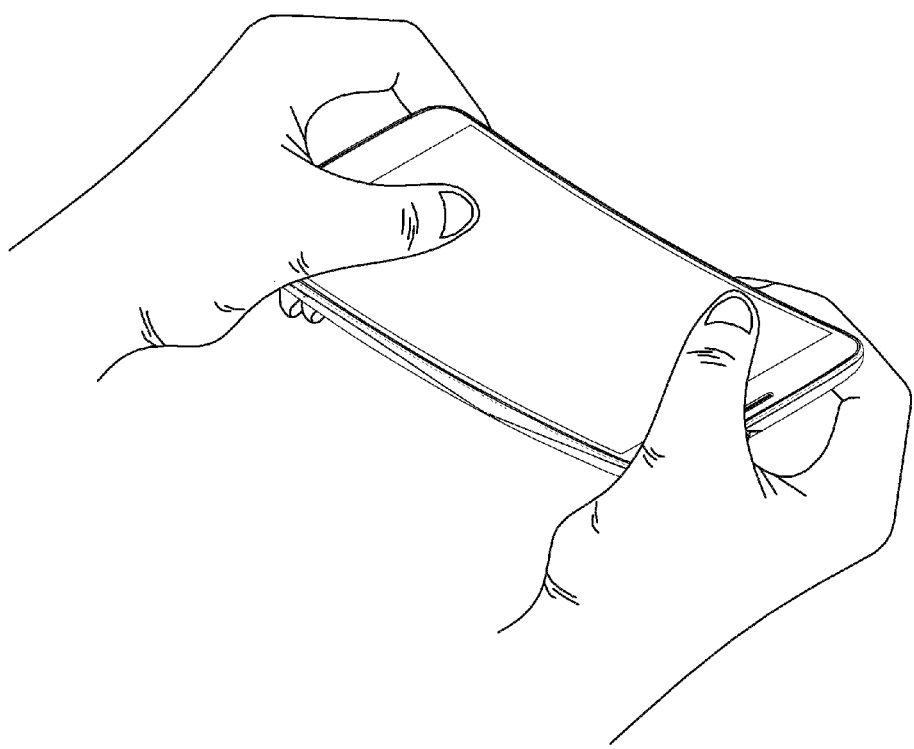

Referring to FIG. 15, the touch panel may include a flexible touch panel. Thus, the touch device including the touch panel may be a flexible touch device which may be bent or flex by a hand of a user. The flexible touch device may be applied to a wearable touch device.

Figure 16:
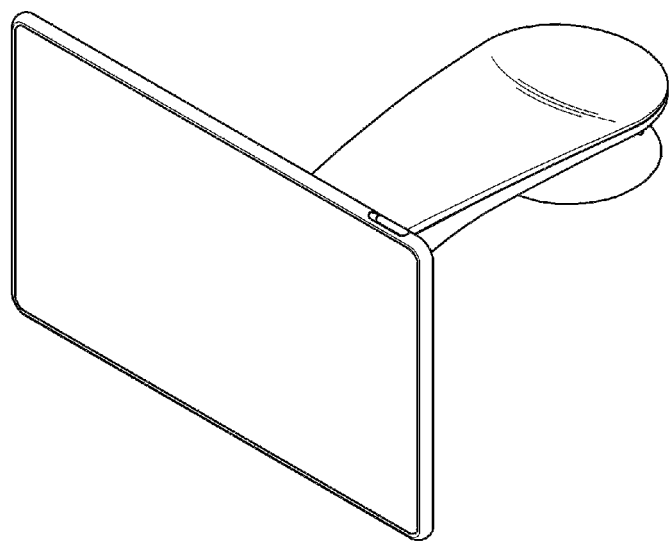

Referring to FIG. 16, the touch panel may be applied to a vehicle navigation system as well as the touch device, such as the mobile terminal.

Figure 17:

Referring to FIG. 17, the touch panel may be applied inside a vehicle. In other words, the touch panel may be applied to various parts in the vehicle where the touch panel is applied. Accordingly, the touch panel is applied to a dashboard as well as a PND (Personal Navigation Display), thereby realizing a CID (Center Information Display). However, the embodiment is not limited thereto. In other words, the touch panel may be used in various electronic products.

The embodiment provides a touch panel capable of improving reliability and a touch device including the same.

According to the embodiment, there is provided a touch panel which includes a substrate including an active area and an unactive area; a sensing electrode on the substrate; a wire electrically connected with the sensing electrode; a ground electrode on the substrate; a sub-ground electrode protruding toward an end portion of the substrate; and a first area defined by the sub-ground electrode, wherein the first area has a width larger than a line width of the sub-ground electrode.

According to the embodiment, there is provided a touch device which includes a display panel; and a touch panel on the display panel, wherein the touch panel includes a substrate; a sensing electrode on the substrate; a wire electrically connected with the sensing electrode; a ground electrode on the substrate; a sub-ground electrode protruding toward an end portion of the substrate; and a first area defined by the sub-ground electrode, wherein the first area has a width larger than a line width of the sub-ground electrode.

According to the embodiment, the ground electrode may be disposed to surround an instruction icon. The ground electrode may be disposed along the instruction icon. Thus, noise can be prevented and instructions can be precisely input when the user inputs the instructions through the instruction icon.

According to the embodiment, the sub-ground electrode may be disposed at an edge of the substrate. Thus, static electricity or ESD, which is introduced from the outside of the touch panel, may be primarily induced to the sub-ground electrode, so that the static electricity or ESD can be effectively blocked. In addition, wires can be prevented from being damaged.

Further, the sub-ground electrode may be away from the pad part on the substrate. Therefore, the ESD or noise, which may occur in the pad part due to the sub-ground electrode, can be effectively prevented.

The first area is defined by the sub-ground electrode and the first area can reduce or prevent noise caused by mechanical components on the display panel.

According to another embodiment, the substrate includes a protrusion area corresponding to an area where the sub-ground electrode is disposed, so the accuracy of the align process can be ensured when forming the sub-ground electrode. That is, the protrusion area may serve as an align mark, so that the sub-ground electrode can be precisely formed on a desired position.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a substrate including an active area and an unactive area;
   a sensing electrode on the substrate to sense a position;
   a wire electrically connected with the sensing electrode;
   a ground electrode on the substrate; and
   a sub-ground electrode branching from the ground electrode to surround a first area,
   a pad part at an end portion of the ground electrode, wherein a shortest distance from the active area to the end portion of the ground electrode is longer than a shortest distance from the active area to the pad part.

2. The touch panel of claim 1, wherein a minimum width of the first area is larger than a minimum width of the sub-ground electrode.

3. The touch panel of claim 1, wherein the sub-ground electrode comprises a first sub-ground electrode and a second sub-ground electrode, and the first sub-ground electrode faces the second sub-ground electrode.

4. The touch panel of claim 3, wherein an end portion of the first sub-ground electrode faces an end portion of the second sub-ground electrode.

5. The touch panel of claim 3, wherein the first sub-ground electrode and the second sub-ground electrode comprises at least one bending portion.

6. The touch panel of claim 1, wherein the substrate comprises a protrusion area.

7. The touch panel of claim 6, wherein the sub-ground electrode is disposed on the protrusion area.

8. The touch panel of claim 6, wherein the protrusion area corresponds to the sub-ground electrode.

9. The touch panel of claim 1, wherein the first area is an open area.

10. The touch panel of claim 1, wherein the sub-ground electrode is at an outer peripheral portion of the substrate.

11. The touch panel of claim 1, wherein the sub-ground electrode is at an edge of the substrate.

12. The touch panel of claim 1, further comprising an instruction icon in the unactive area,
wherein the ground electrode is disposed while detouring the instruction icon.

13. The touch panel of claim 1, wherein the substrate comprises a first substrate and a second substrate, and the ground electrode comprises an upper ground electrode on the first substrate and a lower ground electrode on the second substrate.

14. The touch panel of claim 13, wherein a ratio of a line width of the upper ground electrode to a line width of the lower ground electrode is in a range of 1:1 to 1:2.

15. A touch device comprising:
a display panel; and
a touch panel on the display panel,
wherein the touch panel comprises:
a substrate;
a sensing electrode on the substrate to sense a position;
a wire electrically connected with the sensing electrode;
a ground electrode on the substrate;
a sub-ground electrode protruding toward an end portion of the substrate; and
a first area defined by the sub-ground electrode,
wherein the first area has a width larger than a line width of the sub-ground electrode,
a pad part at an end portion of the ground electrode,
wherein a shortest distance from the active area to the end portion of the ground electrode is longer than a shortest distance from the active area to the pad part.

16. The touch device of claim 15, wherein a second area corresponding to the first area is defined at a lateral side of the display panel, and a mechanical component is disposed on the second area.

17. The touch device of claim 16, wherein the mechanical component comprises an antenna.

* * * * *